United States Patent [19]

Weber

[11] 4,147,973

[45] Apr. 3, 1979

[54] FREQUENCY DEPENDENT AMPLITUDE MODULATED TRANSLATOR APPARATUS

[76] Inventor: Harold J. Weber, 20 Whitney Dr., Sherborn, Mass. 01770

[21] Appl. No.: 752,667

[22] Filed: Dec. 20, 1976

[51] Int. Cl.² .................... G01V 3/12; H04B 5/02; H04B 13/02

[52] U.S. Cl. ...................... 324/3; 328/115; 325/38 A

[58] Field of Search .............. 324/3, 52, 66, 67; 328/115; 329/109; 325/38 R, 38 A, 325, 64

[56] References Cited

U.S. PATENT DOCUMENTS

| | | | |
|---|---|---|---|
| 2,601,248 | 6/1952 | Brenholdt | 324/67 |
| 2,651,021 | 9/1953 | Hays | 324/52 |
| 3,066,256 | 11/1962 | Rasor | 324/67 X |
| 3,309,690 | 3/1967 | Moffitt | 324/67 X |
| 3,418,572 | 12/1968 | Humphreys | 324/67 |
| 3,621,384 | 11/1971 | Yamada | 324/52 |
| 3,829,765 | 8/1974 | Siler | 324/67 |

FOREIGN PATENT DOCUMENTS

1172683 12/1969 United Kingdom ............. 324/52

Primary Examiner—Gerard R. Strecker

[57] ABSTRACT

My invention relates to an improved frequency dependent amplitude modulated translator apparatus and more specifically, to a demodulation apparatus which accepts first, or higher, frequency incoming electromagnetic signals of various average levels and produces a second, or lower, frequency output, the rate of which varies proportionately in relation to the average first frequency level. The translator operates in conjunction with a unique modulation waveform of the first frequency as produced by a separate exciter apparatus. The waveform consists of a novel signal pattern comprised of a higher first frequency alternating current source of electromagnetic power which is methodically amplitude modulated in step-like bursts with a plurality of lower, second frequency alternating current rates wherein each particular component second frequency rate causes a sequacity of singular first frequency bursts of various magnitudes with the absolute step amplitude of each first frequency burst being greatest for the less frequently occurring second frequency rates and least amplitude for the most frequently occurring second frequency rates. The translator recovers the individual component second frequency rates in proportion to their instantaneous peak amplitude as compared to the overall average signal level and therefore, when the average signal level is low, the least frequently occurring higher peak amplitude second frequency bursts will be recovered resulting in a lower second frequency output, whereas when the average signal level is higher, the more frequently occurring lower peak amplitude second frequency bursts will be recovered resulting in an accordingly higher second frequency output. The translator is appropriately suited as an indicator of diminishing first frequency electromagnetic field strength between my herewithin disclosed translator and a cooperative exciter, when the coupling between the two contrivances is separable in form.

14 Claims, 9 Drawing Figures

FREQUENCY DEPENDENT AMPLITUDE MODULATED TRANSLATOR APPARATUS

SUMMARY

My invention relates to the method and means, together with the combination of mechanical and electrical elements to effect an improved order of the apparatus used in the rapid sensory indication, to an operator with limited skill of the variations of first or higher frequency electromagnetic energy levels induced by a separate compatible exciter means. In particular my invention discloses the method and means for accepting a first frequency electromagnetic signal of various mean levels and causing a second or lower frequency to be derived therefrom which gives proportional indication of the first frequency energy density caused by an external exciter means at the region of interposition with the coupling means to my said translator.

In prior art methods, excitation means providing a relatively constant induction field level are employed. Subsequently the relative level of this field is amplified in a receptor device, rectified, and used to indirectly control an audio frequency voltage controlled oscillator. The result is an audio frequency which is pitch modulated in some proportion to the relative level of the intercepted excitation apparatus field.

My new invention employs a separate cooperative exciter means which produces a higher first frequency alternating current source of electromagnetic power which is methodically modulated in amplitude in a series of step-like bursts at numerous lower second frequency alternating current rates wherein each particular rate creates a singular burst of said first frequency, the duration of which represents less than one total cycle period of the highest second frequency rate and furthermore where each said singular burst of said first frequency is at an absolute amplitude which is greatest for the less frequently occurring second frequency rates and least amplitude for the most frequently occurring second frequency rates. The said numerous second frequency rates as provided by the separate exciter are all caused to be concurrently operative with intrinsic harmonic relationship.

My new invention discloses the method and means for converting the resultant separate exciter sequent energy pattern field into a purposeful form. My new invention finds particular application as the translater or receptor apparatus to indicate relative changes in the degree of coupling of the said first frequency between the said separate efficacious exciter means and my translater means by virtue of a change in the apparent pitch of the second frequency when the said second frequency is caused to fall within the audibility range of the operator. When the said cooperative exciter and my new translater are portable and separable in form my new apparatus finds particular importance as an indicator of diminishing first frequency electromagnetic field strength between the said exciter and the said translator, and as such finds particular application as a means for tracing and surveying concealed structures as buried cables, pipes concealed in architectural construction, or any of a variety of other such combinations of concealment as may present itself requiring the tracking of a more conductive structure within a less conductive medium.

REFERENCE TO DRAWINGS

My disclosure includes four sheets of drawings containing six figures as.

SPECIFICATION

Figure 1:
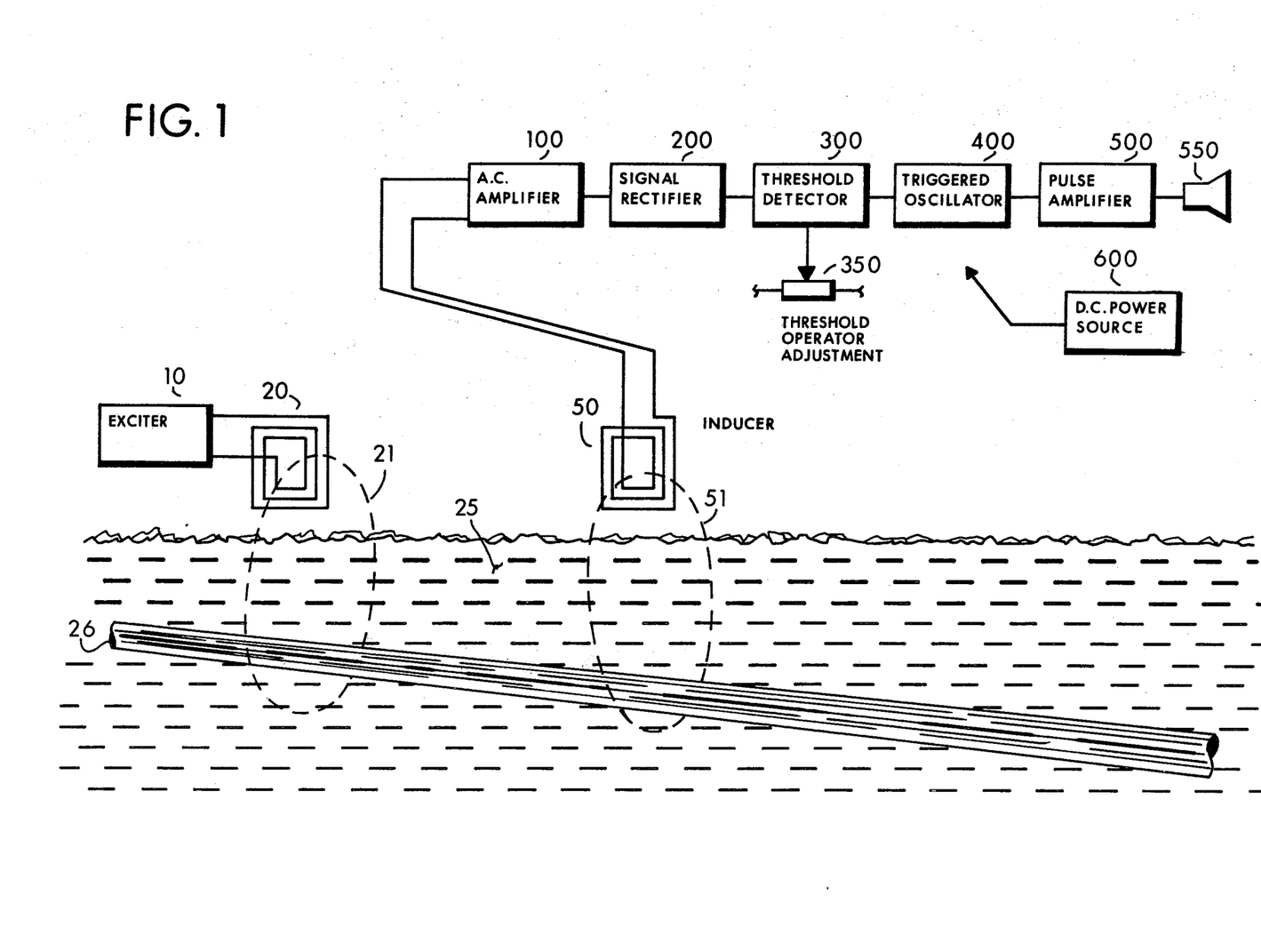
FIG. 1—Functional block diagram for translator means.

FIG. 1 is a block diagram showing my new invention. In my new invention an inducer means 50 is operative to pickup an electromagnetic field 51. This said field 51 has been caused by an efficacious exciter means 10 together with coupling means 20 to cause radiated field lines 21. The said field lines 21 sympathetically couple energy into structure 26 which in this particular example is obscured in a covert medium 25. The said inducer 50 couples to an A.C. amplifier means 100 wherein the signal from the said inducer 50 is caused to be increased. The greater signal at the output of amplifier means 100 is detected by signal rectifier 200. The recovered lower frequency components from said signal rectifier are coupled to a threshold detector means 300 together with a threshold operator adjustment 350. A threshold detector 300 output couples to a triggered oscillator or pulse conditioning means 400 for signal conditioning. The output of the said oscillator or conditioning means 400 outputs to a pulse amplifier means 500 and therefrom to sensory transducer 550. D.C. Power to operate all the circuits is provided by source means 600.

Figure 2A:
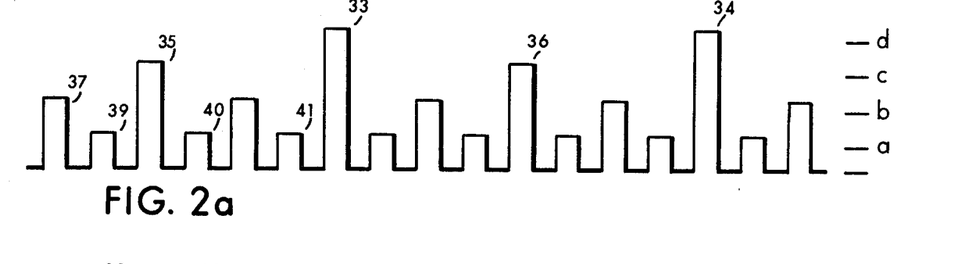
FIG. 2a—Waveform representation for four level composite signal.
Figure 2B:
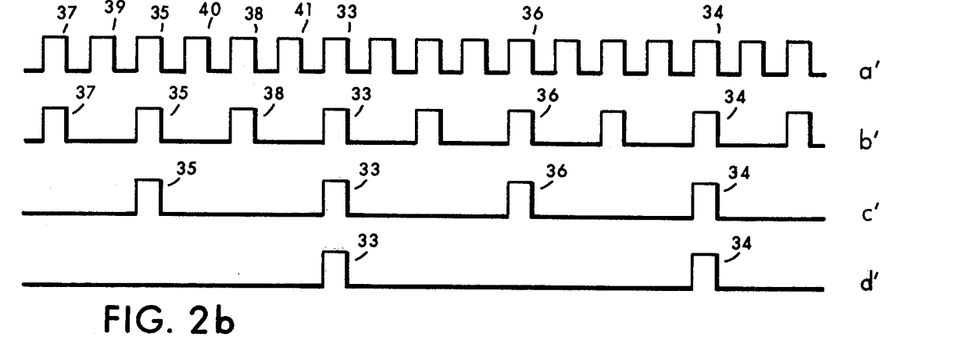
FIG. 2b—Waveform representation for individual components of composite four level signal.

Operation of my new invention is enabled by receiving an ordered higher frequency electromagnetic signal from an efficacious exciter means producing a sequential pattern of various instantaneous energy level steps controlled at a lower frequency rate. FIG. 2a shows the form of a simple ordered signal capable of producing four different level dependent translated tones. Together FIGS. 2a and 2b show how my translator means can serve to recover a "tone" from the composite signal in FIG. 2a the rate of which is relative to amplitude. If my translator is adjusted to recover only levels equal to or greater than d in FIG. 2a, only pulses 33 and 34 will be demodulated resulting in the pulse rate shown as d' in FIG. 2b. Likewise, threshold adjustment of the translator to recover levels equal to or greater than c, b, or a will result in respective harmonious outpulse rates shown as c', b', and a' respectively. The relationship of the signals in FIGS. 2a and 2b can be correlated by pulses, or signal bursts 33 through 41 as shown. If the a' pulse rate or frequency, for purpose of simple illustration, be a value of 4,000 hertz, the b' will be 2,000 hertz, c' will be 1,000 hertz, and d' will be 500 hertz.

Figure 3:
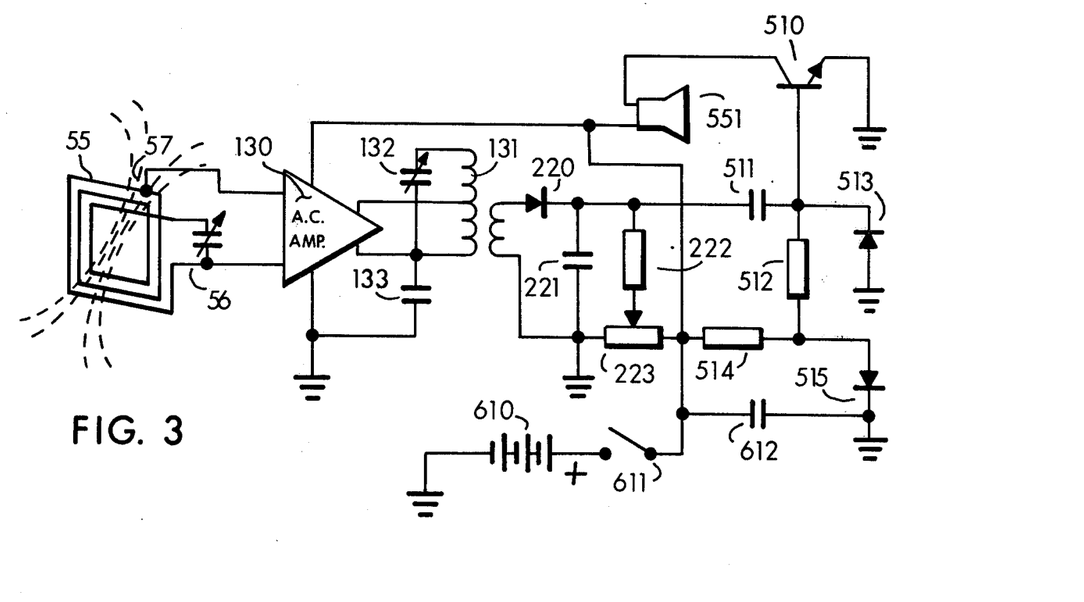
FIG. 3—Schematic for representative translator using anti-rectification biased diode threshold detector.

FIG. 3 shows one form of my translator wherein inducer coupling means 55, resonated by capacitor 56 at about 442 kilohertz in one tried embodiment, is arranged for the interception of electromagnetic field lines of various magnitudes at the first or higher frequency emanated by the said separate efficacious exciter. The said inducer is operative to provide minute alternating current levels proportional to the relative power of the said electromagnetic field lines. The input to A.C. amplifier 130 is fed from an impedance matching tap 57 on the inducer 55. The A.C. amplifier 130 increases the higher frequency signal amplitude reproducing a greater amplitude level at the output which couples through transformer 131 tuned by capacitor 132 into signal demodulator 220. An incoming signal will be rectified thereby accumulating a charge in capacitor 221 whenever the incoming signal is more positive than the rectifier cathode. This is a key part of my invention as the point, or threshold of detection may be established by potentiometer 223. When the slider on potentiometer 223 is near the ground end, normal detector action occurs; however when the arm is advanced to the potentiometer 223 end connecting to the source of positive voltage, anti-rectification or positive back bias is applied to the signal rectifier 220 cathode through load resistor 222, thereby establishing the minimum signal level at which signal rectification demodulator, or detection will occur.

The resultant signal bursts are coupled through blocking capacitor 511 to the base of amplifier transistor 510 together with clamp diode 513 and bias resistor 512. The bias resistor 512 is fed from one diode junction drop voltage level developed across diode 515 by current resistor 514 to establish the operating point of transistor 510 very near the "turn on" point to negate threshold, thus sensitivity, effects in the output stage. This provides the output stage with nearly the sensitivity of a linear, Class A or B, amplifier without the power waste brought on by usual linear mode biasing schemes. Transistor 510 serves to drive a sensory transducer 551 such as an acoustic reproducer, or loudspeaker.

Capacitors 133 and 612 help stabilize the apparatus, while switch means 611 disconnects battery 610.

Figure 4:
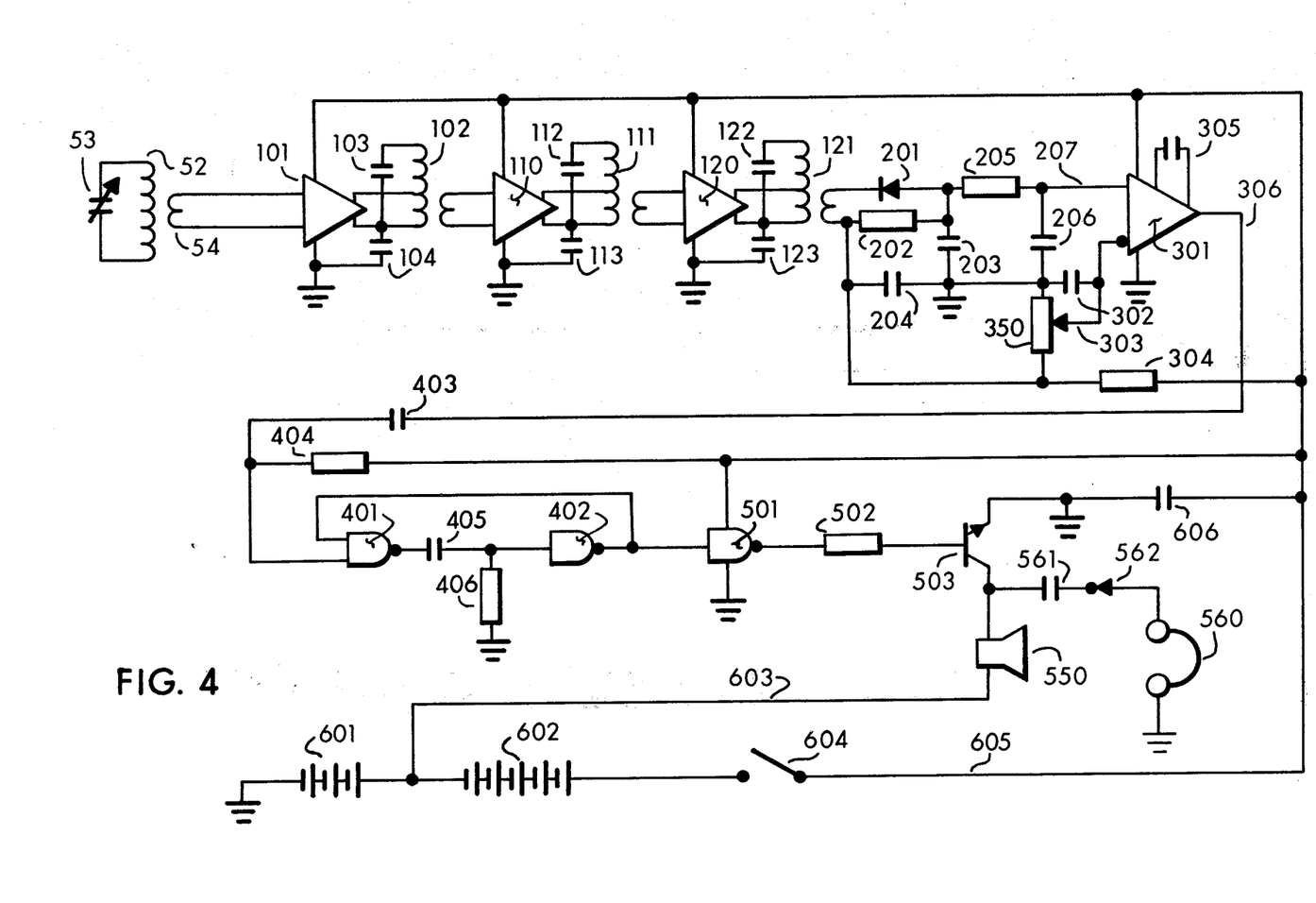
FIG. 4—Schematic for a preferred embodiment of translator.

FIG. 4 shows my preferred embodiment for my translator with improvements over FIG. 3. An inducer 52 resonated by capacitor 53 at the first or higher frequency is coupled by means of a pickup loop 54 as shown, or alternatively a tap on winding 52 as employed in my FIG. 3 on inducer 55, to an A.C. amplifying means consisting of gain devices 101, 110, 120, resonant transformers 102, 111, 121 together with tuning capacitances 103, 112, 122, and bypass capacitors 104, 113, 123. The bandwidth or pass band response characteristics of my A.C. amplifier is caused to be narrow to improve the noise immunity of my translator together with enabling higher amplifier gain to be used before noise becomes overwhelming thereby resulting in greater practical weak signal operating range.

The output of the A.C. amplifier means is coupled through transformer 121 to signal rectifier 201 together with load resistor 202 and load or detector capacitor 203. The juncture of resistor 202 and transformer 121 is bypassed by capacitor 204 while being connected to a source of reference voltage caused at the juncture of potentiometer resistor 350 and resistor 304, so selected in their respective values that this said reference voltage is more or less midway between ground and the supply potential on line 605.

This positive reference voltage is under no signal conditions caused to connect to the non-inverting input 207 of comparator connected operational amplifier 301 through a noise integrating network resistor 205 and capacitor 206. The result is that with the arm or slider 303 on potentiometer 350 nearest the juncture end with resistor 304, any negative signal rectified by 201 will subtract from the positive reference voltage and thereby cause the output 306 of comparator 301 to abruptly go negative. When the arm 303 of the potentiometer 350 is moved towards the ground end, greater negative signal levels will be required to cause the comparator to transistion, the result being a threshold level sensitivity for separating the larger, but less frequent, second lower frequency signal bursts from the lesser amplitude but more frequent, signal bursts.

The negative going signal on the output 306 is coupled through capacitor 403 to a triggered one-shot, or monostable multivibrator circuit, serving as a pulse regeneration means, consisting of two operatively coupled inverting gain devices 401, 402 together with timing resistance 406 and timing capacitor 405. The triggered one-shot oscillator serves to regenerate the second frequency incoming signal pulses into a waveform of more uniform measure and thereby delivers a negative pulse to inverting gain device 501 for every trigger pulse coupled via capacitor 403, with the period of the said pulse being predetermined to be somewhat less than one cycle period of the highest component second, or lower frequency incoming rate represented as an illustrative example by a' in FIG. 2b. The inverted output from device 501 serves to turn-on transistor 503 through base resistor 502 resulting in a sensory signal from transducer 550 which may be supplemented by connecting headphones 560 through blocking capacitor 561 and disconnect means 562.

A combination of electrochemical cell apparatus operative to produce a united electrical effect is employed as D.C. power source 601 to supply line 603 for the transducer 550, together with a source 602 to supply line 605 bypassed by capacitor 606 through disconnect means 604 for the purpose of supplying comparator 301 and other gain device and circuit power requirements.

Figure 5:
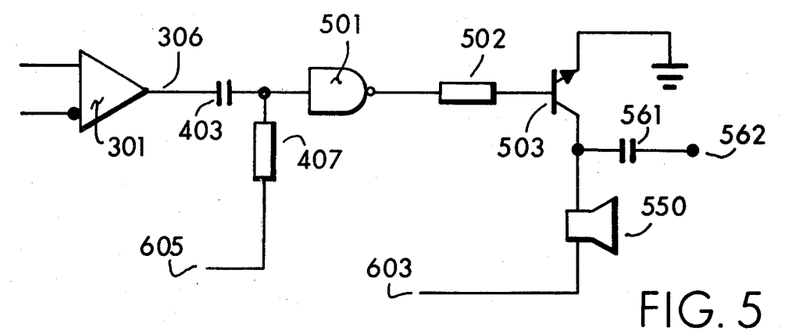
FIG. 5—Schematic for alternative translator deleting triggered oscillator circuitry.

FIG. 5 shows a variation on my triggered one-shot, or monostable circuit shown in FIG. 4. The said two operatively coupled gain devices 401 and 402 in FIG. 4, together with associated components 404, 405 and 406 have been omitted. FIG. 5 shows the alternate circuit connection wherein capacitor 403 couples the output 306 from comparator 301 directly into gain device 501, with resistor 407 serving as a pull-up, or bias resistor for gain device 501. The circuit operation following gain device 501 is like that described for FIG. 4. This variant method affords some circuit simplification and possible cost saving at the tradeoff sacrifice of somewhat less quality, or uniformity of the recovered lower second frequency.

Figure 6:
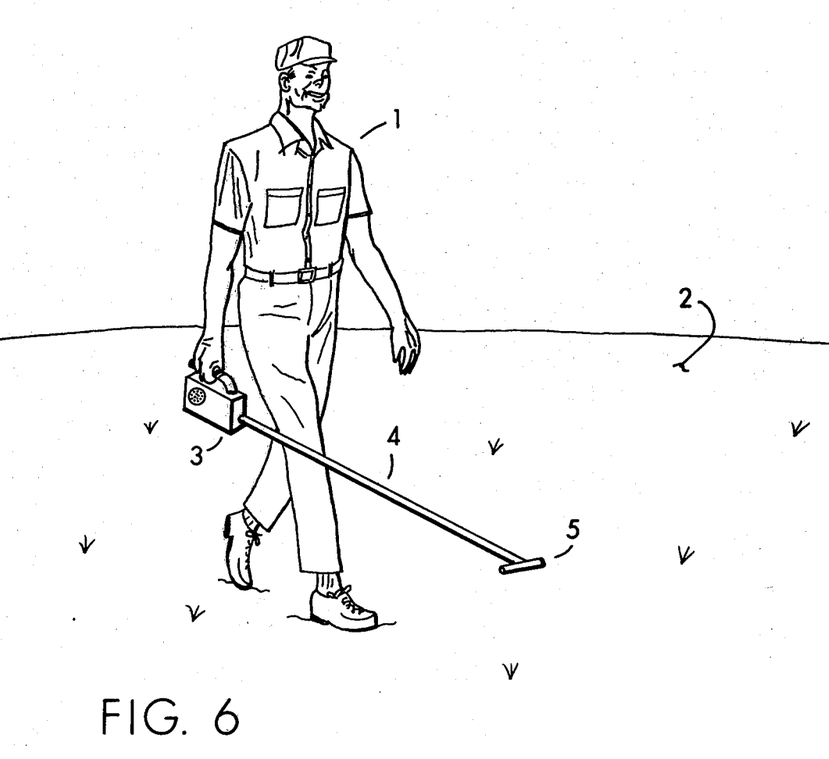
FIG. 6—Practical form for translator as hidden structure survey apparatus.

FIG. 6 shows a particular form my translator takes to be effective for use as a portable hidden pipe or cable locator. An operator 1 traversing the terrain 2 is shown using my new invention which is carried by a handle affixed so as to support the electrical housing 3 containing gain devices, batteries, transducer, operator control and whatever else is associated with my translator, said housing 3 being physically supported at one end of a short staff 4, the other end of which supports my inducer means 5. As the operator transports the transducer over the terrain, an acoustical signal of highest pitch will occur when the inducer is carried so as to be directly above the buried pipe or whatever is being explored, said buried or concealed structure having been separately caused to reradiate electromagnetic field lines by a cooperative exciter apparatus.

In FIGS. 3 and 4 my embodiments show the use of an inducer means 55 and 52 respectively which is resonant at the higher frequency. Although an open loop style pickup inducer, or antenna is satisfactory I find improved operating performance by winding the said inducer means upon a higher permeability material core such as ferrite or powdered iron. The advantage is smaller size, together with higher gain or Q-factor resulting in better resolution as a locator.

Figure 7:
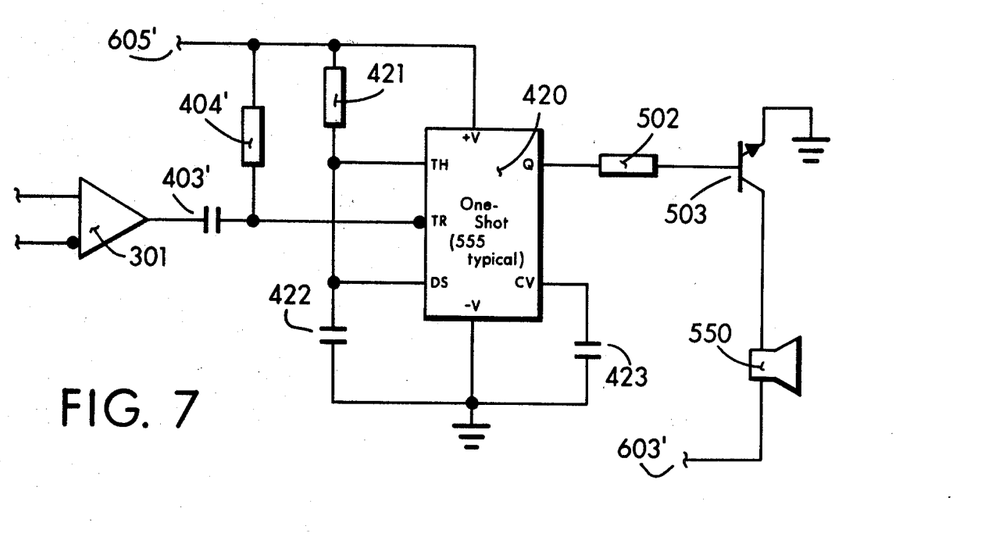
FIG. 7—Partial circuit detail for pulse regenerator using integrated circuit timer function.

FIG. 7 shows yet another circuit detail for a pulse regeneration circuit which employs an integrated circuit timer, say type 555, to condition the second frequency signals provided by amplifier 301 prior to application to transducer 550. The timer 420 receives input trigger pulses differentiated by capacitor 403' and resistor 404'. Regenerated pulse width is established by timing components 421, 422, 423. The output NPN transistor is driven by the timer 420 "Q" output through resistor 502 thereby serving to drive sensory inducer 550.

Figure 8:
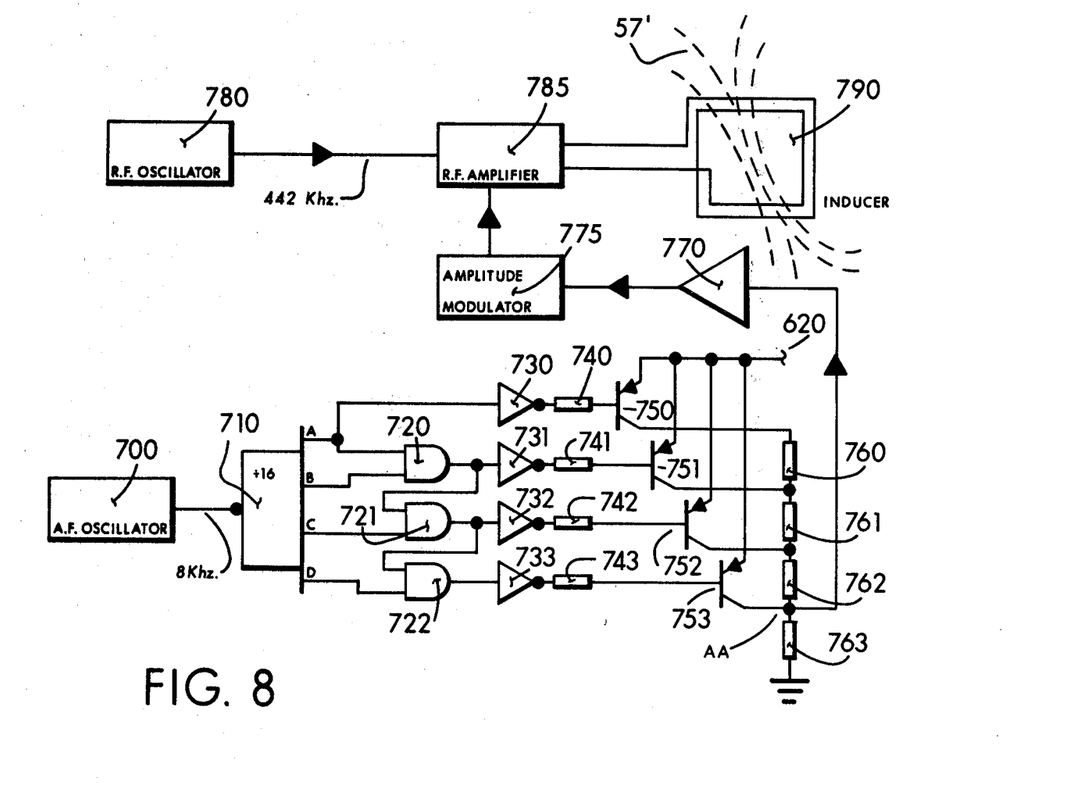
FIG. 8—Circuitry for providing a modulated test signal suitable for demodulation by the instant invention.

FIG. 8 shows a demonstrative circuit for developing a four level composite frequency-dependent amplitude modulated signal. Shown are four stages, however the method may readily be extended to "n" stages or levels of elaboration. An oscillator, clock, or otherwise derived source 700 provides a signal of high frequency which is double that of the highest desired second frequency. The high frequency 700, typified as 8-kilohertz serves to drive a four stage binary counter or divider circuit 710 which results in four outputs A, B, C, and D and respective typical frequencies of 4-KHz, 2-KHz, 1-KHz, and 500-Hz. Combinative circuitry consisting of two input AND logic gates 720, 721, 722 serve to provide three unique control signal outputs in addition to the "A" output directly derived from the counter 710. The AND gate outputs are unique in that only once during every sixteen clock cycles can an output occur at the output of gate 722, or only once for every eight clock cycles at the output of gate 721, or only once for every four clock cycles at the output of gate 720. The four separately combined outputs serve to drive inverting buffers 730, 731, 732, 733. The buffer outputs drive PNP transistors, say 2N3906, the collectors of which couple to a resistor network 760, 761, 762, 763. For purpose of discussion, if resistor 763 = R, and:

resistor 762 = 0.333 R,
resistor 761 = 0.667 R, and
resistor 760 = 2.0 R, the result will be that at the summing point "AA," the levels for the different period bursts will be, where level equals "E," as: 1.0 E, 0.75 E, 0.50 E, and 0.25 E, or in effect the most frequent second frequency (counter 710 "A" output) will be but 25% of the lowest second frequency rate. A linear isolation amplifier 770 serves to drive an amplitude modulator 775 which acts upon the first frequency sourced by oscillator 780 and amplified by 785 so as to drive inducer 790 thereby effecting an electromagnetic field 57' which is modulated as bursts of at least several cycles of first frequency signal the instantaneous level of which are determined by the summing combination amplitude produced by the cominatorial circuit.

My invention has particular application as the translator or receptor apparatus to indicate relative changes in the coupling of the said first frequency between the separate exciter and my invention by means of a change in the pitch of the second frequency when the said second frequency is caused to fall within the audibility range of the operator. My invention is appropriately suited for use as an indicator of diminishing first frequency electromagnetic field strength between my herewithin disclosed translator and the said separate exciter, when the two said contrivances are separable in form. Specific application for such apparatus would be for tracing and surveying concealed structures as buried pipes, cables concealed in an architectural construction, or any of a variety of other such combinations of concealment as may present itself requiring the tracking of a more conductive structure within a less conductive medium.

I have hitherto described my invention in terms of a particular form because that form presents most clearly the manner of construction, as for example it might include one which is submersible in form, or one that is affixed to or part of another machine, or a form that is itself propelled, or that is transported in some other manner. understood that my invention is also applicable to other manner of construction.

While my invention has been shown to use particular types of integrated circuit gain and function devices, a person skilled in the art could duplicate the same function from built up circuits consisting of individual components arranged in a wide variety of combinations, or with other combinations of integrated circuit gain devices.

While my invention is shown to use an inducer consisting of a class of device described as a loop antenna, with or without improved permeability core means, my invention shall not be restricted to this manner of input means but shall also be construed to include any means suited to accepting a higher first frequency signal of various amplitudes, including optical and acoustical means.

While my A.C. amplifier is shown as a straight amplifier, or more specifically as a class of amplifier commonly referred to as a tuned radio frequency amplifier, this shall not serve to restrict my new invention to this kind of said amplifier but shall include superhetrodyne or regenerative amplifying means, or any method known to those skilled in the art suited for the purpose of the said A.C. amplifier means.

While my detector means is shown as a diode rectifier, other known art detectors suited to the methods of my invention shall be included.

While my threshold detector shows a particular form using a comparator circuit or a back-biased diode, these methods alone do not encompass all methods known to those skilled in the art, but rather shall serve to include any threshold detection means suited to satisfy the intent of my invention that provides for the means to separate the various rate amplitude modulated signals in some proportion to their relative amplitude.

While my triggered oscillator is shown as a means for conditioning my received signal, this alone shall not serve to eliminate the choice of other means suited to bettering the recognizability of the threshold separated pulses, or signal bursts by those of good skill in this art.

The elements comprising my said translator when properly coupled to each other as in FIGS. 3, 4 and 5 form a compact package which can principally be contained upon a printed circuit board or like support means within a protective housing. My model which operates successfully utilizes the following key components and component values.

| | |
|---|---|
| integrated circuit 101, 110, 120, 130 | uA-703 |
| integrated circuit 301 | CA3130 |
| integrated circuit 401, 402, 501 | ¼CD4011 |
| transistor 503, 510 | 2N5172 |
| diode 201, 220 | 1N270 |
| diode 513, 515 | 1N914 |
| transformer 102, 111, 121, 131 | Interstage coupling transformer 442 KHz |
| inducer 55 | resonates with capacitor 57 at 442 KHz |
| inducer 52 | resonates with capacitor 53 at 442 KHz. |
| capacitor 104, 113, 123, 133, 204, 302, 606, 612 | 100 nanofarad |
| capacitor 203, 221 | 1 nanofarad |
| capacitor 206, 403, 405 | 5 nanofarad |
| capacitor 305 | 68 picofarad |
| capacitor 511 | 10 nanofarad |
| capacitor 561 | 470 nanofarad |
| resistor 202 | 8,200 ohms |
| resistor 205, 406, 407 | 12,000 ohms |
| resistor 222, 304, 403, 514 | 4,700 ohms |
| resistor 502 | 1,000 ohms |
| resistor 512 | 47,000 ohms |
| potentiometer 223, 350 | 5,000 ohms |
| battery 601 | 4.5 volts |
| battery 602 | 7.5 volts |
| battery 603 | 12 volts |
| disconnect 604, 611 | SPST switch |
| transducer 550, 551 | electrodynamic loudspeaker |
| transducer 560 | headphones |

The foregoing parameters and values are given by way of example only to assist a person of average skill to duplicate my invention for experimental purposes and are not intended to limit in any way the scope of my new invention.

CLAIMS

What I claim is:

1. A translator means operative as a receptor for an ordered first frequency electromagnetic signal pattern, produced by a separate efficacious exciter means, wherein said first frequency signal is modulated so as to produce a series of different amplitude steps, sequentially controlled by a combined plurality of second frequency signal rates which form a harmonic series, wherein further each component second frequency signal forming the combined signal produces a first frequency signal burst, consisting of at least several cycles of first frequency signal, the time duration of which is somewhat less than the full cycle time period of the highest second frequency signal component and further where the second frequency signal controlled serial plurality of first frequency signal bursts are caused to be combined in a manner such that the least frequent, say lowest periodicity, said second frequency component signal provides a said first frequency signal burst of greatest magnitude, whereas the more frequent, say higher periodicity, said second frequency component signal provides said first frequency signal bursts of proportionately less magnitude, wherein said translator includes faculty for subsequent demodulation of the said ordered first frequency signal into individual component second frequency signal repetition rates proportional to the relative mean power of the said ordered first frequency signal arriving at the said receptor means, said translator including in combination:

a. Coupling means for the interception of a first frequency electromagnetic signal comprising a pattern of various magnitudes produced by a separate said exciter means, said coupling means being operative to provide a series of minute alternating current levels proportional to the relative instantaneous power of the first frequency signal energy contained within the said electromagnetic signal;

b. A.C. amplifier means, including input thereto connected to said coupling means, said A.C. amplifier being in a form operative to increase the magnitude of the said minute alternating current levels inputed from the said coupling means and reproducing a greater amplitude level at the output of the said A.C. amplifier means;

c. Demodulator means, connected to said A.C. amplifier means output, operative to recover the said component second frequency signal rates from the said first frequency signal;

d. Threshold adjust means, operatively connected to said demodulator means, to provide for dynamic redetermination of the demodulator amplitude response threshold for selective amplitude separation of the sequential said component second frequency signal from the said first frequency signal bursts;

e. Triggered oscillator means, connected to said demodulator means, operative so as to condition and standardize the said recovered said component second frequency signals into constituent second frequency signal periods of uniform measure;

f. e. Pulse amplifier means, connected to said triggered oscillator means, operative to effect the said recovered said component plurality of second frequencies lower frequency to be of a form suitable for actuating a subsequent sensory transducer means; and, g. A source of direct current power including a disconnect means so arranged as to provide operating voltage and current to each of the functional circuit groups comprising the said translator.

2. Translator means of claim 1 wherein said coupling means is an induction loop containing a core of improved higher magnetic permeability.

3. Translator means of claim 1 wherein said A. C. amplifier means is caused to be selectively resonant at the said first frequency for improved noise immunity resulting in greater operating range.

4. Translator means of claim 1 wherein said demodulator means consists of a signal rectifier means which may be caused to become controllably reverse biased to determine the threshold of separation of the said second frequency rate components from the said modulated said first frequency signal.

5. Translator means of claim 1 wherein said threshold adjustment is effected through the use of a demodulator means including a level comparator circuit operative so as to provide means for establishing the threshold of separation of the said second frequency rate components from the said modulated said first frequency signal.

6. Translator means of claim 1 wherein said triggered oscillator means is a monostable relaxation oscillator pre-established to produce a separate output component signal for each constituent demodulated component second frequency signal rate cycle and furthermore where each said output component period is somewhat less than the cycle period of the most frequently occurring second frequency signal rate.

7. Translator means of claim 1 wherein said sensory transducer means consists of an audio reproducer suited for human auditory perception.

8. Translator means of claim 1 wherein said threshold operator adjust means is caused to act upon the said translator so as to predetermine the threshold of separation of the said component second frequency signal from the said first frequency signal through effecting change in the gain of the said A. C. amplifier means.

9. Translator of claim 1 wherein the said direct current power source includes a combination of electrochemical cell apparatus, or battery, operative to produce a united electric effect.

10. Translator of claim 1 wherein the said translator apparatus is made in a form particularly suited for the class of apparatus used for tracing buried or otherwise hidden structures, said form including a short staff supporting an inducer means at one end, while a housing containing the electrical apparatus and operator controls, together with a handle, is affixed to the other end of the staff.

11. A portable translator apparatus for producing a sensory indication including in combination:
   a. A source of first frequency signal electromagnetic energy modulated in a step-like manner by a harmonious plurality of component second frequency signals wherein each component second frequency signal impulse appears as a first frequency signal burst, consisting of at least several cycles of first frequency signal, the duration of which is somewhat less than the fullcycle period of the highest component second frequency signal, and further where the plural component second frequency signal controlled bursts of first frequency signal are caused to be combined in a manner such that the least frequent recurring said second frequency signal impulse provides a first frequency signal burst of greatest magnitude, whereas the more frequent said component second frequency signals conversely provide first frequency signal bursts of proportionately less magnitude;
   b. Coupling means operable so as to serve as a terminal means for receiving from said source of first frequency signal a sequential pattern of first frequency electromagnetic energy modulated by a harmonious plurality of component second frequency signals at various instantaneous magnitudes and providing at an output means a composite pattern of alternating current levels proportional to the relative said instantaneous mangitudes;
   c. A.C. amplifier means, the input of which connects to said output of said coupling means, operative to increase the amplitude of the said alternating current levels;
   d. Demodulator means connected to said amplifier means operative to act upon the said composite pattern of alternating current levels so as to separate the plural second frequency signal components from the said first frequency signal;
   e. Threshold determination means connected to said demodulator means operative as a level detector so as to determine the minimum amplitude of the various said component second frequency signal amplitude controlled said first frequency signal burst levels which will result in second frequency signal output from the said demodulator means;
   f. Output amplifier means connected to said demodulator means which is operative to provide second frequency signal of increased measure at an output terminal means;
   g. Transducer means connected to said output amplifier terminal means to provide a sensory output indication; and,
   h. Direct current power source so arranged as to provide operating voltage and current to each of the functional circuit groups comprising the said translator.

12. The translator in claim 11 wherein the said source of first frequency electromagnetic energy and the said coupling means are separable in form so as to enable the use thereof in a cooperative manner such that the extent of such separation will result in a proportional variation in the average level of the said alternating current levels appearing at the said coupling means output.

13. The translator of claim 11 wherein a pulse regeneration circuit is connected operatively between the said demodulator means output and the said output amplifier means input so as to regenerate the incoming second frequency signal pulses into waveform of more uniform measure.

14. The translator of claim 11 wherein the said first frequency is a radio frequency signal and further wherein the said plural second frequencies are a plurality of harmonious audio frequency signals.

* * * * *